(12) United States Patent
Case et al.

(10) Patent No.: US 9,229,543 B2
(45) Date of Patent: Jan. 5, 2016

(54) MODIFYING STYLUS INPUT OR RESPONSE USING INFERRED EMOTION

(71) Applicant: Lenovo (Singapore) Pte. Ltd., Singapore (SG)

(72) Inventors: Michaela Rose Case, Raleigh, NC (US); Daniel Jordan Schantz, Raleigh, NC (US); Wesley Abram Luttrell, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 69 days.

(21) Appl. No.: 13/930,015

(22) Filed: Jun. 28, 2013

(65) Prior Publication Data

US 2015/0002485 A1    Jan. 1, 2015

(51) Int. Cl.
| | |
|---|---|
| *G06K 9/32* | (2006.01) |
| *G06F 3/033* | (2013.01) |
| *G06F 3/0354* | (2013.01) |
| *G06F 3/0488* | (2013.01) |
| *G06K 9/00* | (2006.01) |
| *G06K 9/22* | (2006.01) |
| *G06K 9/72* | (2006.01) |

(52) U.S. Cl.
CPC ........ *G06F 3/03545* (2013.01); *G06F 3/04883* (2013.01); *G06K 9/00442* (2013.01); *G06K 9/222* (2013.01); *G06K 9/723* (2013.01)

(58) Field of Classification Search
CPC ............ G06F 3/03545; G06F 3/04883; G06F 17/243; G06K 9/723; G06K 9/00442; G06K 9/222
USPC .......... 382/187, 305; 704/1–10; 345/173, 179
See application file for complete search history.

(56) References Cited

U.S. PATENT DOCUMENTS

| | | | |
|---|---|---|---|
| 8,577,026 B2 * | 11/2013 | Lablans ........................ 380/28 |
| 8,712,755 B2 * | 4/2014 | Kristensson et al. ............. 704/1 |
| 2014/0015776 A1 * | 1/2014 | Kim et al. ..................... 345/173 |
| 2014/0253463 A1 * | 9/2014 | Hicks ............................ 345/173 |
| 2014/0253520 A1 * | 9/2014 | Cueto et al. ................... 345/179 |
| 2014/0253522 A1 * | 9/2014 | Cueto ........................... 345/179 |

* cited by examiner

*Primary Examiner* — Sheela C Chawan
(74) *Attorney, Agent, or Firm* — Ference & Associates LLC

(57) ABSTRACT

An aspect provides a method including: identifying one or more symbols input to a surface of a first device; determining, using at least one processor, one or more modified input parameters associated with input of the one or more symbols; determining a modification to an association for the one or more symbols based on the one or more modified input parameters; and executing an action corresponding to a modified association for the one or more symbols. Other aspects are described and claimed.

20 Claims, 11 Drawing Sheets

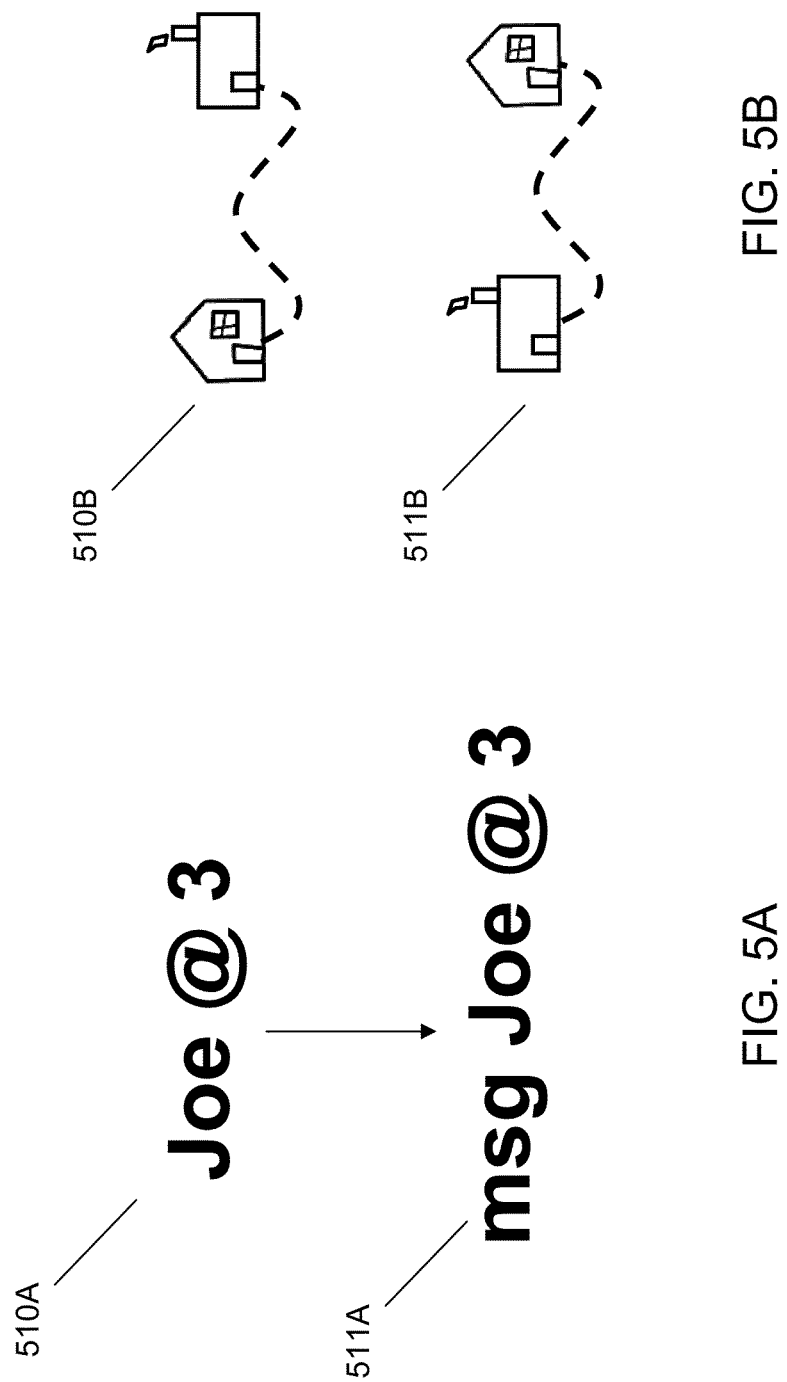

msg Joe @ 3pm

FIG. 7A msg Joe @ 3

FIG. 7B

810A — Dear Joe, please email your info. Thanks!

810B — Dear Joe, please email your info. Thanks!

FIG. 8

MODIFYING STYLUS INPUT OR RESPONSE USING INFERRED EMOTION

BACKGROUND

Optical character recognition is the conversion of characters (e.g., in a scanned image or handwritten letters/symbols input to a touch screen) into text (e.g., machine coded text). Optical character recognition (OCR) technology is typically restricted to one-to-one correlation with alphanumeric characters and in some cases basic geometric shapes. OCR technology has attempted to allow handwriting, e.g., on a touch screen, as an alternative to keyboard input. Because typing is faster than handwriting, the trend has been to translate pen input like keyboard input, e.g., by individual characters and words.

Shorthand, for its part, is an abbreviated or symbolic writing that speeds or abbreviates longhand writing. Originally, shorthand was developed as a faster way to write without losing any important information.

BRIEF SUMMARY

In summary, one aspect provides a method comprising: identifying one or more symbols input to a surface of a first device; determining, using at least one processor, one or more modified input parameters associated with input of the one or more symbols; determining a modification to an association for the one or more symbols based on the one or more modified input parameters; and executing an action corresponding to a modified association for the one or more symbols.

Another aspect provides an information handling device, comprising: a device surface configured to receive user input; one or more processors; and a memory accessible to the one or more processors storing instructions executable by the one or more processors to: identify one or more symbols input to the device surface; determine one or more modified input parameters associated with input of the one or more symbols; determine a modification to an association for the one or more symbols based on the one or more modified input parameters; and execute an action corresponding to a modified association for the one or more symbols.

A further aspect provides a product, comprising: a computer readable storage medium storing instructions executable by one or more processors, the instructions comprising: computer readable program code configured to identify one or more symbols input to a surface of a first device; computer readable program code configured to determine, using at least one processor, one or more modified input parameters associated with input of the one or more symbols; computer readable program code configured to determine a modification to an association for the one or more symbols based on the one or more modified input parameters; and computer readable program code configured to execute an action corresponding to a modified association for the one or more symbols.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

BRIEF DESCRIPTION OF THE SEVERAL VIEWS OF THE DRAWINGS

FIG. 5(A-B) illustrates examples of combinatorial relationship sensitivity for stylus inputs.

FIG. 7(A-B) illustrates examples of dimensionality relationships for stylus inputs.

FIG. 8 illustrates an example of stylus input parameter sensitivity for stylus inputs.

DETAILED DESCRIPTION

Figure 1:
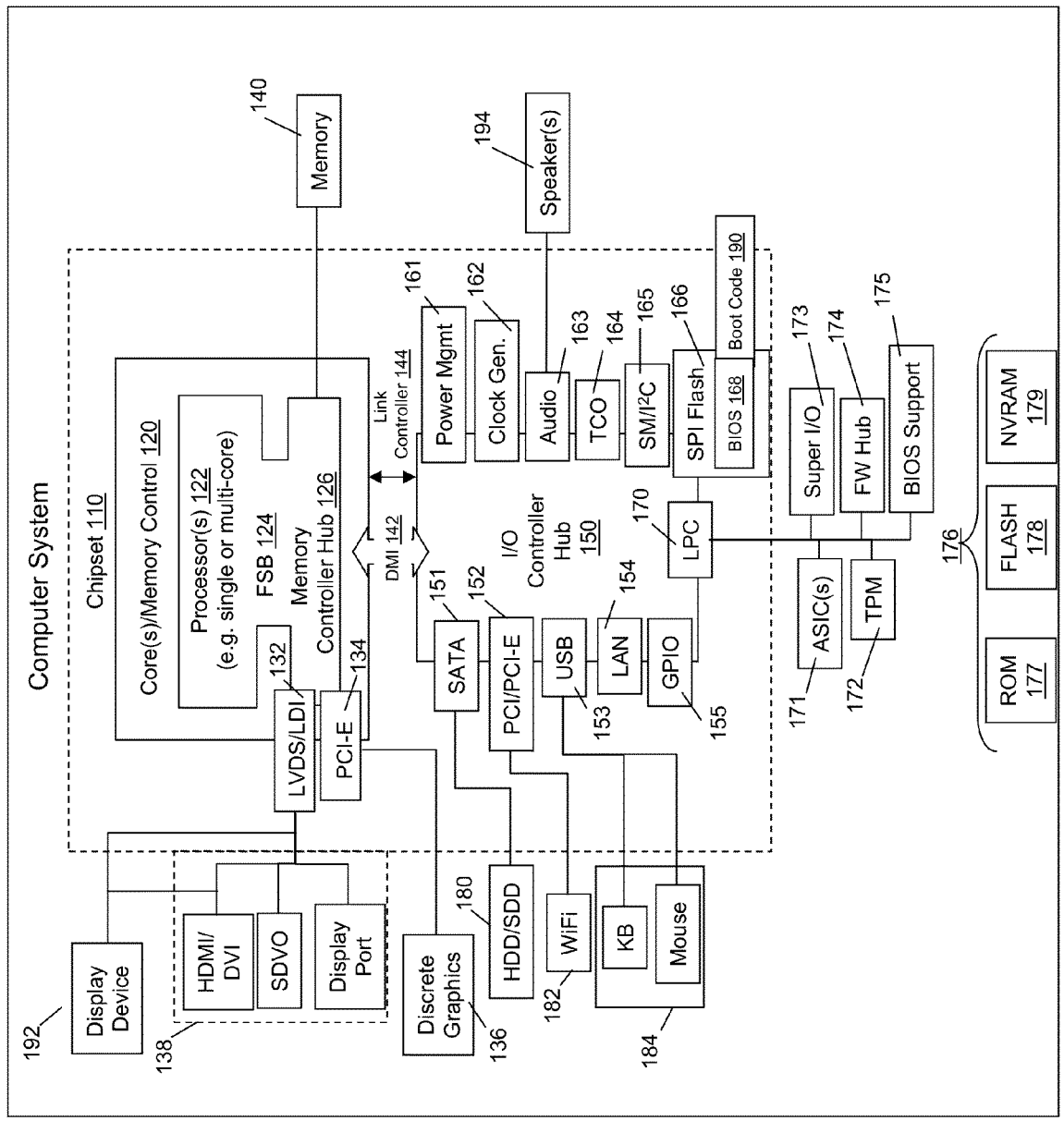
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Throughout this description, "pen" and "stylus" are used interchangeably as a term referring to an implement for inputting or providing information to a surface of an electronic device forming a user interface. In some cases, a "pen" or "stylus" may include a user's body part, e.g., one or more fingers, unless the example clearly implicates or is limited to a mechanical pen/stylus. Moreover, touch screens, digitizers and the like are used as example surfaces capable of accepting input information from a "pen" or "stylus" (broadly construed); however, these are non-limiting examples and other surfaces that accept input, e.g., including those utilizing optical gesture detection as well as or in lieu of touch input detection, as alternative input devices and surfaces may be utilized in the various examples given throughout this description unless the example clearly implicates or is limited to a particular implementation, e.g., a touch input surface, as will be apparent to those having ordinary skill in the art.

While OCR and symbol recognition has been implemented in electronic devices, e.g., on a character-by-character basis, this approach misses many of the advantages that handwriting has over typing. Unlike keyboard input that is restricted to alphanumeric characters and predefined symbols, handwriting is unconstrained. Users can write in letters, alphanumeric characters, or symbols, straight lines or waves, and the like. Handwriting is unique and users may even enhance their handwriting ability with the use of shorthand. Users may also have multiple symbols for the same concept, and symbols used for concepts evolve over time, often rapidly. This is an area that is painfully missed by the current pen/stylus input technologies.

Conventional pen input capabilities are limited. Pens can be used to navigate, draw, and write. Some gesturing capability has been provided, e.g., by MICROSOFT Corp. in certain WINDOWS products, e.g., "pen flicks". OCR allows for handwriting and some symbols to be recognized and translated into typed text and shapes. For example, the SAMSUNG GALAXY NOTE 2 supports so-called "pen gestures" where a user can write a word and replace the word with an image of the word (for example, a user may write the word "fish" and be provided with images of fish to insert). The GALAXY NOTE 2 also supports pen shortcuts for basic functions (for example, writing the symbol "#" opens the dial pad), some of which require additional text to execute the command (for example, writing the symbol "~" next to the written word "Joe" opens a user interface to send a text message to a contact named "Joe"). However, none of these conventional approaches use combinations of symbols like a language.

An embodiment leverages shorthand style speed and brevity, and its complementary characteristic of retaining valuable information using symbols, with enhanced computer processing capabilities. An embodiment provides for stylus inputs similar to shorthand to be used in an enhanced environment, e.g., enhanced by the computer processing capabilities of pen/digitizer pairs and/or touch screen technologies. An embodiment utilizes mechanisms of human language to improve upon the current stylus (electronic pen) experience.

The illustrated example embodiments will be best understood by reference to the figures. The following description is intended only by way of example, and simply illustrates certain example embodiments.

Figure 2:
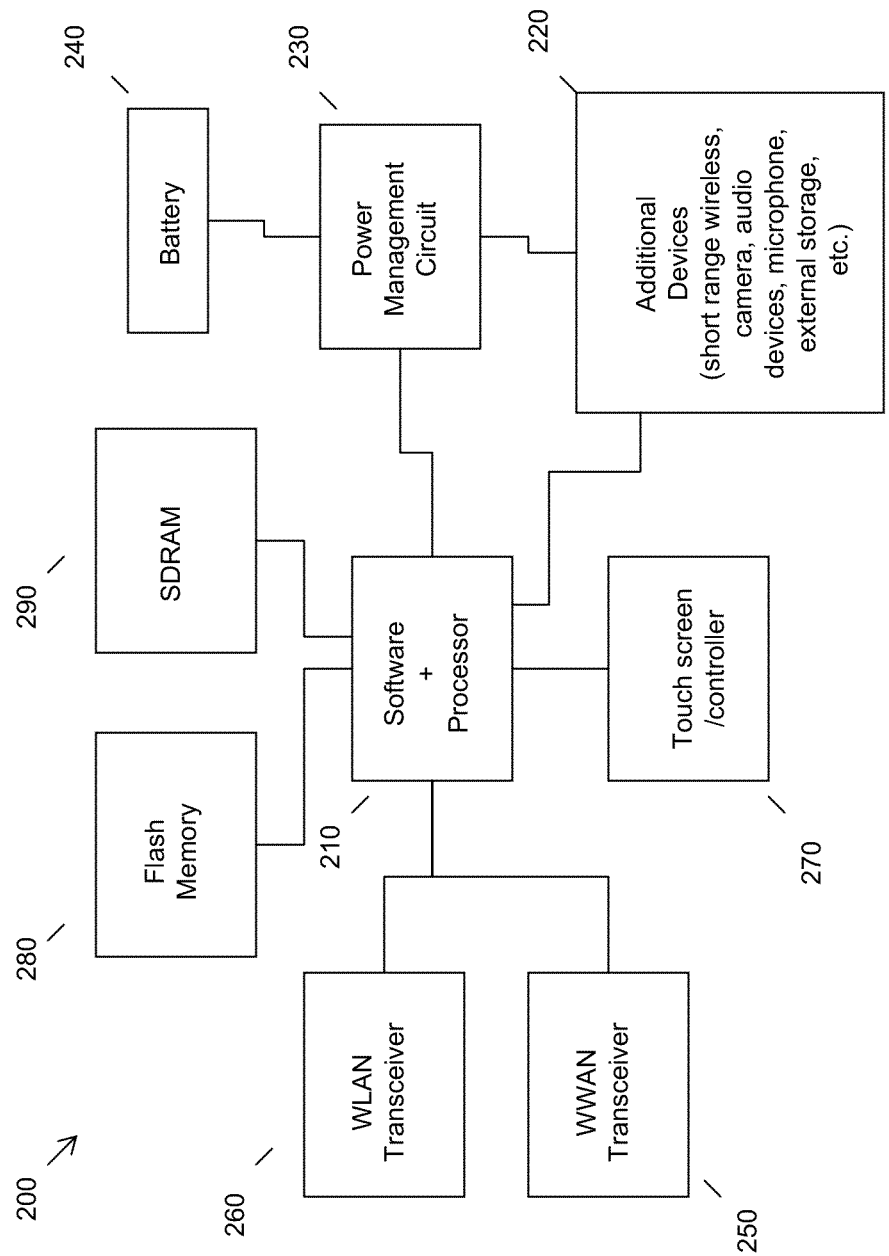
FIG. 2 illustrates another example of information handling device circuitry.

Referring to FIG. 1 and FIG. 2, while various other circuits, circuitry or components may be utilized in information handling devices, with regard to smart phone and/or tablet circuitry 200, an example illustrated in FIG. 2 includes an ARM based system (system on a chip) design, with software and processor(s) combined in a single chip 210. Internal busses and the like depend on different vendors, but essentially all the peripheral devices (220) may attach to a single chip 210. In contrast to the circuitry illustrated in FIG. 1, the tablet circuitry 200 combines the processor, memory control, and I/O controller hub all into a single chip 210. Also, ARM based systems 200 do not typically use SATA or PCI or LPC. Common interfaces for example include SDIO and I2C.

There are power management chip(s) 230, e.g., a battery management unit, BMU, which manage power as supplied for example via a rechargeable battery 240, which may be recharged by a connection to a power source (not shown). In at least one design, a single chip, such as 210, is used to supply BIOS like functionality and DRAM memory.

ARM based systems 200 typically include one or more of a WWAN transceiver 250 and a WLAN transceiver 260 for connecting to various networks, such as telecommunications networks and wireless base stations. Commonly, an ARM based system 200 will include a touch screen 270 for data input and display. ARM based systems 200 also typically include various memory devices, for example flash memory 280 and SDRAM 290.

FIG. 1, for its part, depicts a block diagram of another example of information handling device circuits, circuitry or components. The example depicted in FIG. 1 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 1.

The example of FIG. 1 includes a so-called chipset 110 (a group of integrated circuits, or chips, that work together, chipsets) with an architecture that may vary depending on manufacturer (for example, INTEL, AMD, ARM, etc.). The architecture of the chipset 110 includes a core and memory control group 120 and an I/O controller hub 150 that exchanges information (for example, data, signals, commands, et cetera) via a direct management interface (DMI) 142 or a link controller 144. In FIG. 1, the DMI 142 is a chip-to-chip interface (sometimes referred to as being a link between a "northbridge" and a "southbridge"). The core and memory control group 120 include one or more processors 122 (for example, single or multi-core) and a memory controller hub 126 that exchange information via a front side bus (FSB) 124; noting that components of the group 120 may be integrated in a chip that supplants the conventional "northbridge" style architecture.

In FIG. 1, the memory controller hub 126 interfaces with memory 140 (for example, to provide support for a type of RAM that may be referred to as "system memory" or "memory"). The memory controller hub 126 further includes a LVDS interface 132 for a display device 192 (for example, a CRT, a flat panel, touch screen, et cetera). A block 138 includes some technologies that may be supported via the LVDS interface 132 (for example, serial digital video, HDMI/DVI, display port). The memory controller hub 126 also includes a PCI-express interface (PCI-E) 134 that may support discrete graphics 136.

In FIG. 1, the I/O hub controller 150 includes a SATA interface 151 (for example, for HDDs, SDDs, 180 et cetera), a PCI-E interface 152 (for example, for wireless connections 182), a USB interface 153 (for example, for devices 184 such as a digitizer, keyboard, mice, cameras, phones, microphones, storage, other connected devices, et cetera), a network interface 154 (for example, LAN), a GPIO interface 155, a LPC interface 170 (for ASICs 171, a TPM 172, a super I/O 173, a firmware hub 174, BIOS support 175 as well as various types of memory 176 such as ROM 177, Flash 178, and NVRAM 179), a power management interface 161, a clock generator interface 162, an audio interface 163 (for example, for speakers 194), a TCO interface 164, a system management bus interface 165, and SPI Flash 166, which can include BIOS 168 and boot code 190. The I/O hub controller 150 may include gigabit Ethernet support.

The system, upon power on, may be configured to execute boot code 190 for the BIOS 168, as stored within the SPI Flash 166, and thereafter processes data under the control of one or more operating systems and application software (for example, stored in system memory 140). An operating system may be stored in any of a variety of locations and accessed, for example, according to instructions of the BIOS 168. As described herein, a device may include fewer or more features than shown in the system of FIG. 1.

Information handling devices, as for example outlined in FIG. 1 and FIG. 2, may provide an enhanced form of shorthand capability that in turn provides opportunities to a user that both advance what may currently be accomplished using a stylus as an input device an overcome shortcomings of pen/paper handwriting. Devices such as those outlined in FIG. 1 and FIG. 2 may provide an input surface (e.g., touch screen, digitizer, etc.) that receives input from a writing implement, referred to herein simply as a "pen" or "stylus", as above.

The use of symbols in products like the SAMSUNG GALAXY NOTE 2 is limited to short, basic strings (e.g., "~ Joe" for "message Joe" action). An embodiment utilizes characteristics of human language to broaden the capabilities of pen input. An embodiment allows users to substitute various symbols for words and facilitate combinations for enhanced user interface capabilities.

Figure 3:
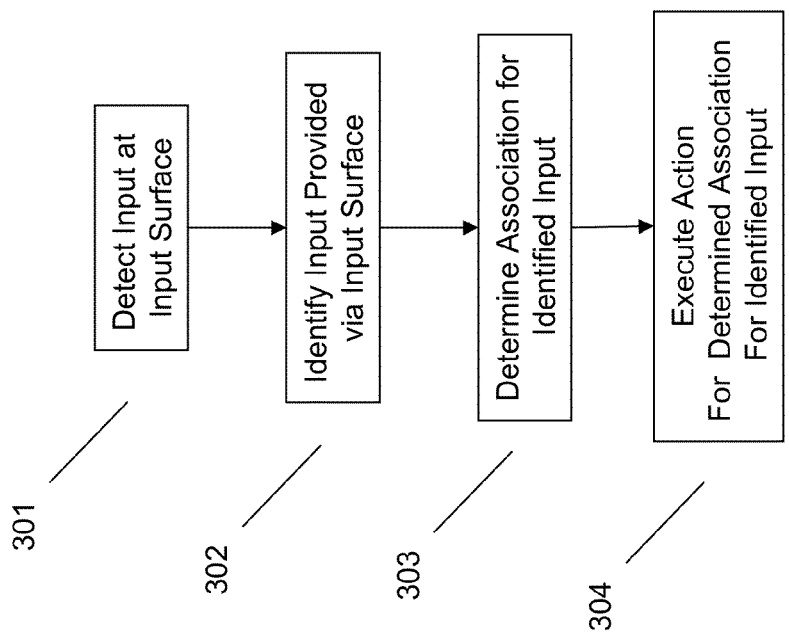
FIG. 3 illustrates an example method of detecting stylus input and implementing an action associated therewith.

Referring to FIG. 3, an embodiment provides an input surface, e.g., a touch screen or like surface which permits a user to provide writing input, e.g., via a stylus or pen. An embodiment detects input at the input surface at 301. The detection at 301 may include for example registering pen or stylus input on a capacitive layer included in the input surface, for example incorporated into a touch screen; however, this is a non-limiting example. The input is identified by an embodiment at 302. This corresponds to, for example, conducting an OCR process on the writing input to identify the characters and/or symbols the user has written at 301.

Once the input has been identified at 301, e.g., as a particular symbol or combination of symbols, an embodiment determines an association for the input at 303. This association for the identified input corresponds to identifying an appropriate system response to the input, e.g., an action to be undertaken in response to identification of a particular symbol or group of symbols. Various determinations may be made at 303, including but not limited to determining an association on the basis of context in which the symbol(s) are provided, determining an association based on a recursive or combinatorial structure identified for the symbol(s), determining an association based on an associative property of the symbol(s), determining an association based on a dimensionality identified with respect to the symbols, determining an association based on an emotion correlated with the symbol(s) input, determining an association based on an identification of shorthand or like script associated with the symbol(s), and determining an association based on one or more lexicons containing associations for the various symbol inputs that may be provided and identified. Suitable combinations of determinations may be made, and as further described herein, representative examples of such determinations (or combinations thereof) are provided throughout.

Once an appropriate association is determined for the input at 303, an embodiment may execute an action corresponding to the association at 304. This may include a variety of functions, including but not limited to performing a user level action (e.g., launching a particular user application), performing a system level action (e.g., storing an identified input and/or association for later use, e.g., by this or another user of a connected or linked device) or combinations of the foregoing.

Context Sensitivity

An embodiment is sensitive to the application(s), nearby symbols, and/or elements in the interface when interpreting stylus input from the user (i.e., identifying and determining an association for the input). Based on this contextual information, the writing/drawing from the user can be interpreted differently, e.g., different interpretation for the same symbol(s) in different contexts.

As an example, drawing the "~" symbol in an e-mail application may be interpreted differently than drawing the "~" symbol in a command prompt. As another example, drawing on a table in a program produces behaviors sensitive to the table. If the program is an MS WORD document processing program, then lines can be used to create new columns/rows in the table. As another example, drawing a circle in a program is used to select relevant elements in that program. If the program is an MS WORD document processing program, then a circle can be used to select a chunk of text or an image within the document, e.g., for copying.

In such scenarios, an embodiment determines what the user intends to perform (i.e., the action, such as what the user is attempting to circle). This may be accomplished by an embodiment inferring or making assumptions about the content involved (e.g., the content that is circled). For example, if a chunk of text has been circled, then the user is likely aiming for a key word, phrase or complete sentence to be highlighted, copied, etc. Knowledge of the content of the document therefore may provide contextual information that assists an embodiment in making the correct selection, even if the user's input is imprecise.

Figure 4B:
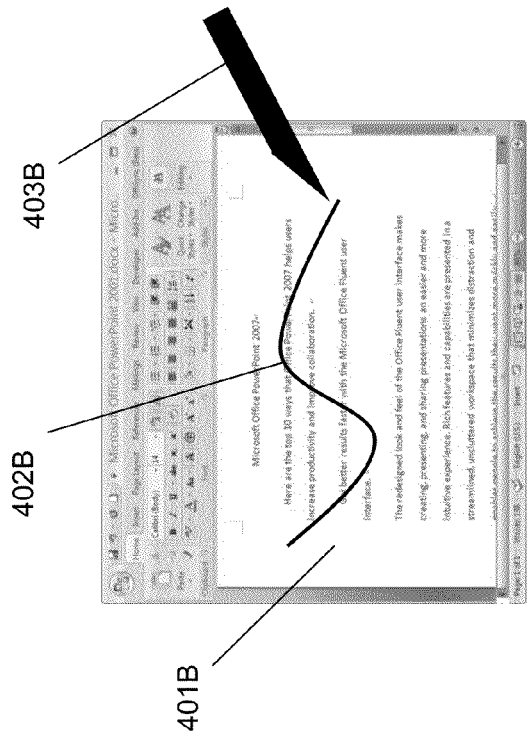
FIG. 4(A-C) illustrates examples of context sensitivity for stylus inputs.
Figure 4A:
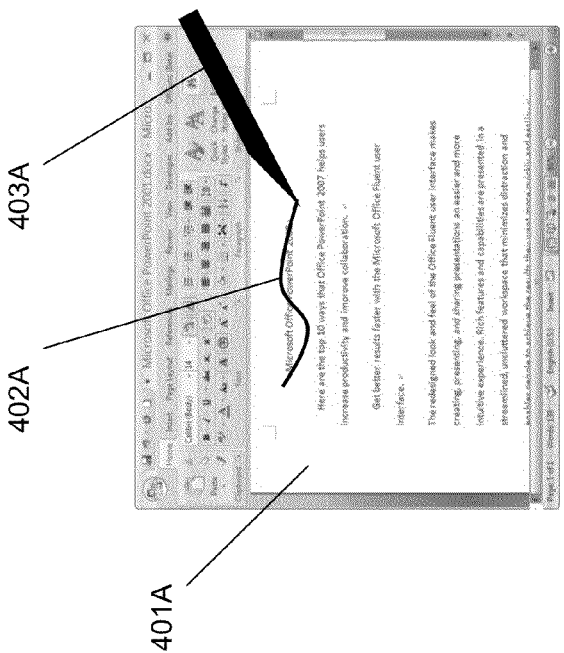

Accordingly, referring to FIG. 4(A-B), a user may provide input to a surface of a device, e.g., a touch screen surface, using for example a stylus to input a wavy line into a word processing document. For a first input wavy line 402A input using a stylus 403A into a document 401A, an embodiment may utilize contextual information in the a variety of ways. For example, an embodiment may determine that the stylus input 402A is input over a document of a word processing application. Moreover, an embodiment may determine that the stylus input 402A covers only a first line of a particular paragraph of the document 401A. In an embodiment where a wavy line 402A has been associated with an action "delete", an embodiment may implement this action as appropriate for the context and communicate it for execution by the word processing application. In the example of FIG. 4A, an embodiment may take the action of deleting only the first line in the paragraph. In contrast, as for example illustrated in FIG. 4B, an embodiment may utilize different contextual information to modify the action. In FIG. 4B, a user has input stylus input 402B, again a wavy line input using the stylus 403B, but this time over an entire first paragraph of the document 401B. In this context, an embodiment may modify the "delete" action by deleting the entire paragraph of text in the document 401B. Thus, an embodiment may utilize one or more pieces of contextual information, e.g., the application(s) operating at the time of input, nearby symbols or elements in the interface or underlying object, such as a word processing document, etc., to modify an action for a given stylus input.

In an embodiment, the same symbol may be used to represent two (or more) different ideas (and therefore execute two (or more) different actions). For example, an embodiment may make a symbol's linked action dependent on the context in which the symbol is input. Each symbol may therefore be, e.g., sensitive to the surrounding elements and their positional relationships.

Figure 4C:
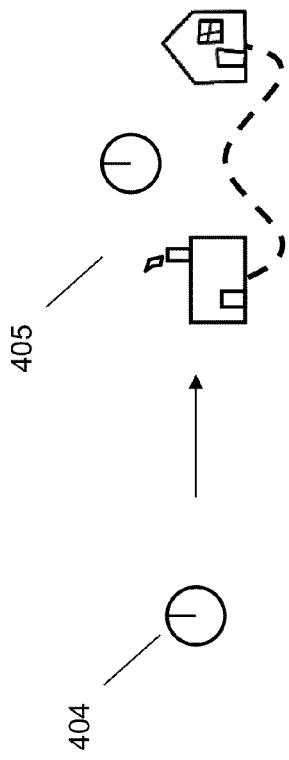

As an example, referring to FIG. 4C, drawing a clock symbol 404 may represent a trigger for an embodiment to display the current time. Drawing a clock symbol in combination with other symbol(s) 405 may represent the amount of time involved in the action associated with the combination of symbols 405. Thus, in a first context, the clock 405 symbol in isolation triggers a first action (e.g., display current time) whereas the combined symbol 405, including the clock symbol as a sub-element, triggers another action dependent on the context, e.g., calculate and display the travel time between work and home.

As another example of context sensitivity, a user may draw an envelope in an email client application to open a new email message (e.g., trigger a compose action within the email application), whereas drawing the same envelope symbol on or in a file (e.g., a word processing document or picture) triggers another action, e.g., a new email composition with the file as an attachment. Similarly, drawing an arrow symbol in a word processing document may insert a corresponding symbol (e.g., a MICROSOFT WINGDING arrow) into the document, whereas drawing the same arrow symbol in an email message triggers forwarding the email message contents under the arrow symbol.

Recursive Combinatorial Structure

In an embodiment, characters or symbols recognized in the stylus input may be structure-sensitive. For example, the same command or action may be represented or executed in different ways. Moreover, an expression input may be expanded on, e.g., via additional input(s), to have or take on a different meaning. This produces interpretation of symbols based on their surroundings. This is accomplished for example by analyzing the symbol position on the display, possible surrounding symbols and/or their physical relationships to one another. Again, the application(s) (e.g., a note-taking application versus a drawing application or an e-mail application) may influence an embodiment's interpretation of the stylus input. This allows users to express the same idea in a number of different ways.

As illustrated in FIG. 5(A-B), in contrast to other systems that only examine short strings of symbols and do not attempt to identify and interpret relationships with other nearby symbols, an embodiment utilizes combinations of symbols to understand intuitive commands from the user. For example, an input of "Joe @ 3" 510A may automatically put a reminder into a user's calendar, e.g., an input of "Joe" at 3:00 p.m. time entry in the calendar application the same day. When this reminder later comes up, e.g., in a popup window prior to the appointment, the user may select to message or call the contact number associated with a contact "Joe". Additionally, an embodiment may intelligently re-interpret an input based on an addition. For example, the user may write "msg" prior to the input of "Joe @ 3" (e.g., via adding to a previous note) to form a new input "msg Joe @ 3" 511A. An embodiment may now prepare to send a message to a user contact "Joe" at 3 p.m., e.g., by opening a text message or email application pre-populated with the contact "Joe" at a predetermined time (e.g., at or a predetermined number of minutes before 3:00 p.m.). In the case where the user has modified the previous input (e.g., via addition of "msg" in 511A), an embodiment may clear the prior action, e.g., a calendar entry at 3:00 p.m. in the example above. Moreover, the user may provide each input 510A and 511A at separate times and have both actions executed, e.g., a calendar entry and a message preparation or reminder.

Thus, an embodiment permits a user to flexibly add to handwritten notes. For example, if a user writes "~Joe @ 3 pm" an embodiment will prepare to send a message to Joe at 3:00 p.m. (e.g., via opening a messaging application at an appropriate time and pre-populated with the contact's information). Later, if the user adds "dinner date" to the previous input "~Joe @ 3 pm", an embodiment will interpret the new input in context with the prior input. Thus, an embodiment will remind the user that the topic of the message to Joe is "dinner date", e.g., via inputting this information into a subject line of an email application or into the first line of an SMS message when prompting the user to send a message to Joe at 3:00 p.m.

It will be understood that the prompt may be either in the message application itself (e.g., a pre-populated message) or a reminder pop-up window with one or more selections (e.g., text message, email, call, etc.) such that the user may control the format of communication. In the example of a popup reminder with selection options, the added information (e.g., "dinner date") may appear in the popup reminder as a clue as to why the user is to message the contact. A link to the underlying input (e.g., stored as a note file) may also be provided such that the user may navigate back to the input from which the reminder was derived by the system.

In an embodiment, a like symbol may be substituted for another using an embodiment. To illustrate, if a user forgets that the default symbol for sending a message is "~" and instead the user writes "txt" (e.g., in an input of "txt Joe"), an embodiment produces the same result for either input, i.e., an embodiment opens a new message application, e.g., text message application, pre-populated with the contact. This may be done via a default association provided by the system, e.g., an equivalence between "txt" and "~", may be a user created association, or may be learned or derived from a community of users, as further described herein.

As from the foregoing examples, an embodiment may utilize the recursive combinatorial structure of the input to influence the actions taken. Referring to FIG. 5B as an example, an embodiment may utilize the structure of the symbols input to influence association determined for the input and the action taken. Thus, if a user inputs a first combination of symbols 510B, e.g., directions from home to work, an embodiment recognizes that the home symbol is "first" (on the left side) and the work symbol is "second" (on the right side) and a line symbol drawn there-between informs an embodiment that the user is desirous of directions. In response to such an input 510B, an embodiment may input (e.g., if a these symbols 510B are provided in the context of a map or navigation application) these symbols into a map application by converting the symbols into predefined address locations (e.g., as previously associated by a user in a symbol lexicon, as further described herein). Similarly, the structure of the symbols (in this case, their ordering left to right) may be modified to modify the action taken by an embodiment. As an example, if a user reverses the symbol structural relationship, as in input 511B, where work is "first" and home is "second", an embodiment will interpret the symbolic structure to indicate that the user is desirous of having directions from work to home loaded in an appropriate map or navigation application.

Associative Symbols

An embodiment utilizes an understanding that language is flexible and allows for transposition of symbols without losing meaning. For longer phrases, this involves some intelligent chunking. An embodiment therefore may identify the symbols input and actions as well as their relationships to each other, and may compare the physical placement of the symbols in the input in order to determine what the user intended.

Figure 6:
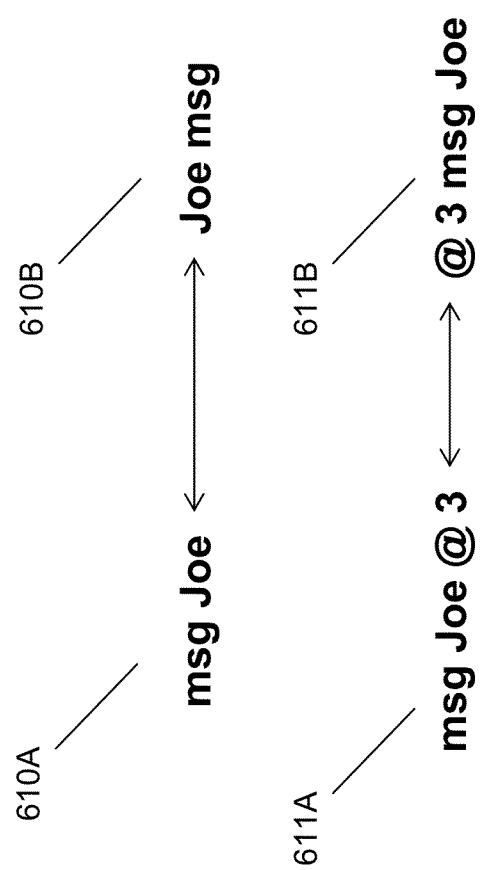
FIG. 6 illustrates examples of recursive relationships for stylus inputs.

Referring to FIG. 6, in contrast to other systems wherein a symbol and key word combination is not interpreted the same as a keyword and symbol combination, in an embodiment, a "symbol+key word" may be interpreted the same as a "key word+symbol", i.e., having the same action associated with these two different inputs. For example, a user inputting either "msg Joe" 610A or "Joe msg" 610B are interpreted by an embodiment as a trigger for an action of send a message to the contact "Joe" with the appropriate application being launched or a reminder set. For example, a user inputting either "msg Joe @ 3" or "@ 3 msg Joe" is interpreted by an embodiment as a request to prompt the user to send a message to the contact "Joe" at 3:00 p.m. Likewise, an embodiment may interpret different symbols (e.g., "msg Joe @ 3" and "@ 3~ Joe") as being the same, even if the user has switched the ordering and/or inserted an equivalent symbol (here, "~" for "msg").

As another example, an embodiment permits a user to insert a comment into a word processing document in a variety of ways wherein the sequence of insertion will be understood to execute the same action. For example, a user may insert a comment into the document by first writing the comment and then adding a line/arrow as to the comment's placement within the document, or a user may first draw a line/arrow to indicate the placement of the comment and then write in the text of the comment for later insertion. Thus, the sequence of inputs is utilized by an embodiment to provide richer meaning to the combined inputs.

Dimensionality

Language is written along a single dimension. Words can only be in front or behind one another. An embodiment creates meaningful groups using punctuation such as periods, colons, commas, exclamation points, etc. When combining symbols, a second dimension can be added because symbols may be written or drawn anywhere in the two-dimensional plane in relation to one another (before, after, above, below). Using this information, an embodiment may produce better interpretations of the user's input. The space between symbols and their positioning also may be used to create "sentences" of writing/drawing with a stylus.

Referring to FIG. 7(A-B), an example is illustrated where the positional relationship or dimensionality of the symbol input is utilized by an embodiment to execute appropriate actions. In FIG. 7A, a user inputting "msg Joe @ 3 pm" may be interpreted by an embodiment to put a reminder in a calendar application of "Joe" at 3:00 p.m. the same day. In FIG. 7B, a user inputting "msg Joe" above "@ 3" may be interpreted by an embodiment to make a list of actions to perform. For example, a list of actions corresponding to the input of FIG. 7B may be to first send a message to Joe, then make an appointment in a calendar application indicating "Joe" for 3:00 p.m. The user may facilitate this behavior by providing an explicit indicator that a list is desired. For example, this list behavior may be triggered responsive to a user including a formatting symbol such as a bullet or a dash prior to and/or after items of a list to indicate a list style action is desired.

An embodiment may utilize information regarding spacing to infer user desired actions. For example, a user writing "~Joe @3 pm" or "~Joe@3 pm" may both be interpreted the same way by an embodiment. Thus, a tolerance or flexibility (in this case, omitting or ignoring spacing information) may be utilized because the order and distances of the symbols are not meaningful. In this way, if users are concerned about the system being confused (much like when a user exaggerates speech for a speech recognition system), the system will successfully interpret both inputs as indicative of "Joe @ 3:00 p.m.". Alternatively, an embodiment may group symbols using spacing in an attempt to separate groups of symbols for separate consideration and action. An embodiment may provide the user with an opportunity to confirm or modify the grouping (or lack thereof) as part of the identification of the input step, e.g., step 302 of FIG. 3.

As another example of utilizing dimensionality information, an embodiment may subscript or superscript a symbol because of its spatial relationship to another neighboring symbol. For example, an embodiment may translate the input by recognizing the two-dimensional relationship of a symbol to the nearby character(s) and match it to a common patter, e.g., $CO_2$. Again, a user may be prompted to confirm that such identification is appropriate.

Emotion

Human language is characterized by the syntax, semantics, and emphasis. What a person speaks or writes has direct meaning by the use of syntax and semantics. What a user means may be derived by emphasis or emotion. For example, speaking the word "Fire" means one thing but yelling the word "Fire!" means another. Using a stylus, users may modify one or more input parameters, e.g., to provide emphasis (or give emotion) by the way they write (e.g., the tilt, pressure, speed, and/or stroke style). This information may be used to adjust the responses of the system. For example, more tilt (e.g., angle at which the stylus is used to provide input), more pressure (e.g., pressure of the stylus input on the screen), faster speed of input, and more abrupt stroke style may be indicative of a heightened emotional state. Other combinations of differences in stylus input style may be indicative of different emotional states.

For example, if a user is writing firmly (e.g., as sensed by pressure of the stylus input for example via a force input sensing layer on the input surface) and providing input quickly, an embodiment may infer that the user is in a rush and/or irritated. To avoid making the situation worse, the system can be more conservative when translating some input (e.g., such as with a long string of symbols) or less conservative in other scenarios (e.g., like a scribbled 9-1-1). Thus, an embodiment may modify or change an action responsive to determining that the triggering input (e.g., symbol(s) input with a stylus) have been provided with an associated emotion (e.g., rushed, agitated, slow/uncertain, etc.).

An embodiment may trigger different or additional actions responsive to determining that the triggering input (e.g., symbol(s) input with a stylus) has been provided with an associated emotion. For example, if an embodiment infers that a user is in a heightened emotional state, e.g., via ascertaining that the stylus input has been provided with increased pressure or speed, an embodiment may keep distractions such as notifications from other applications (e.g., new email or text message has arrived) to a minimum to prevent worsening the emotional state.

As another example, if the user is writing an email with a higher level of pressure than normal, an embodiment may associate a predetermined emotion with this input, e.g., that the user is irritated. An embodiment may execute an additional or modified action responsive to such a triggering input. For example, an embodiment may prevent the user from sending a potentially detrimental email, e.g., by first prompting the user to wait and/or confirm prior to sending the email. Similarly, an embodiment may execute additional action(s) responsive to such a triggering input (i.e., one matching a predetermined emotion). For example, an embodiment may implement an additional language filter to highlight certain portions of text within a message and offer an opportunity for a user to review the text prior to sending the message.

Therefore, referring to FIG. 8, an embodiment may distinguish between two inputs 810A and 810B, otherwise identically formed, on the basis of inferred emotion using additional characteristic(s) of the input(s). The input 810A, illustrated in regular weight text, may have been provided, e.g., via a stylus to a touch screen, using a normal level of pressure, e.g., as determined based on a history of this particular user's input pressures and/or known standard pressures. In contrast, input 810B, illustrated in bold text, may be been provided, e.g., via a stylus to a touch screen, using a higher level of pressure, e.g., as determined based on a history of this particular user's input pressures and/or known standard pressures.

An embodiment may therefore distinguish input 810A from input 810B on the basis of inferred emotion. For example, increased input pressure may be pre-associated with the emotion of intensity, and this in turn mapped to a functional characteristic of increased importance. Thus, an embodiment may utilize the increased pressure of input 810B as indicative of increased importance of input, and, assuming this input is provided as an input to an email application, flag input 810B as of increased importance and execute an additional action, e.g., flagging the email message as high priority.

Processing Shorthand Input Symbols

Using OCR an embodiment may first identify a user's input symbols and thereafter take the identified collection of symbols and translate them, e.g., into full text. Such translation may occur as a task executed in the background. The translated form may be stored in addition to the original input or may be used to replace the shorthand input originally identified, e.g., after user confirmation.

Figure 9:
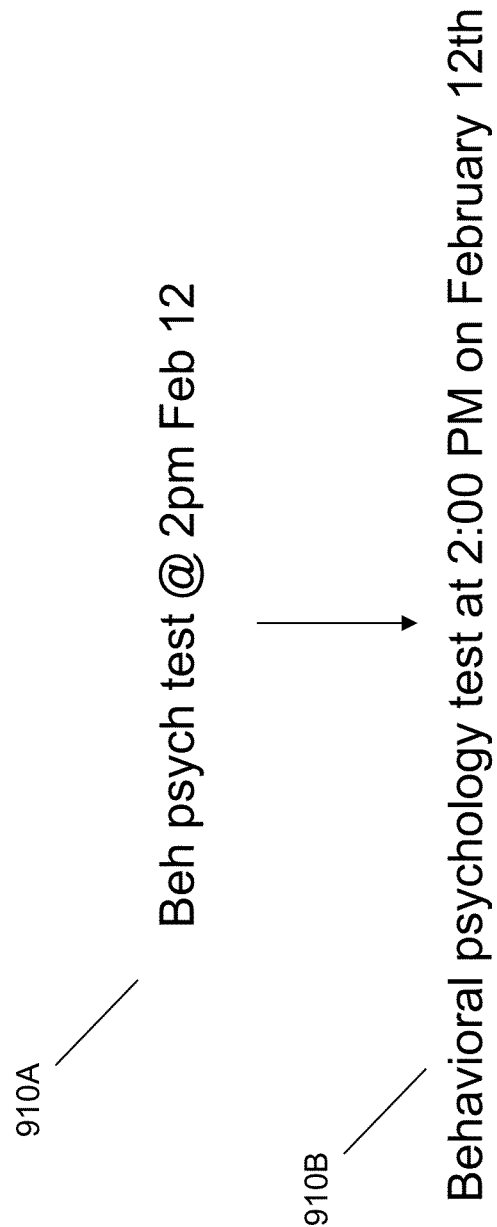
FIG. 9 illustrates an example of translation of stylus shorthand input.

For example, referring to FIG. 9, a user may be taking notes in a class and write note 910A "Beh psych test @ 2 pm February 12". An embodiment may perform OCR to identify the actual input, i.e., "B", "e", "h" and so on and thereafter process the identified input, e.g., separating "Beh" from "psych" and so on. Once the input has been identified literally, an embodiment may translate the input to an inferred, full sentence, e.g., note 910B "Behavioral psychology test at 2:00 PM on February 12th." The translation may be processed in the background so that when the user reviews his or her notes later such a translation will be accessible along with the original note. Moreover, given the translation or modification of the input, e.g., class note 910A to class note 910B, if another user needs a class note, e.g., a friend that missed class that day, the user may send another user either or both versions of the note, e.g., 910A or 910B. When the other user receives them, assuming both 910A and 910B are sent, he or she can adopt the short hand (e.g., save note 910A) and/or he or she may retain the modified/translated version 910B that was stored in the background.

An embodiment may expand on the translation features to provide additional modifications, such as executing related actions using the input provided by a user. For example, OCR may be used by an embodiment to literally identify the input of a user, e.g., a user providing stylus input of "y=x+2" and thereafter provide different versions of the input, including processing thereof, e.g., graphing the function in a graph application.

A translation of the symbol or string of input does not need to produce an action. For example, the symbol or string of input may have a behavior associated with it. Behaviors may be interactive, e.g., based on their context. Users may also easily create their own interactive elements and actions associated therewith to personalize a device interface, as further described herein.

For example, drawing a particular symbol may serve as an interface element (e.g., a button) to take the user to a particular website when tapped. Thus, when the symbol itself is provided, it may not automatically trigger a particular action but rather be associated with a behavior, e.g., further input via tapping on the symbol is required for this particular symbol in the particular context identified, that in turn executes an action, e.g., opening of a web browser and navigating to a particular website.

An embodiment is able to determine when a user has completed a writing/drawing of an element of a symbol or a group of symbols in order to produce the correct behavior or action. Thus, an identification of an input or input session may be appropriately time to ensure a user has completed providing of the input. This may be accomplished in a number of different ways, including but not limited to, a designated button (e.g., tapped or pressed by the user) to indicate a complete string or input session, a tap on or within the string or symbol to signify the user is finished, and/or users may interact with the string with a different modality when they are finished (e.g., create it with a pen/stylus, and interact with a finger thereafter).

Lexicon Creation and Sharing

Figure 10:
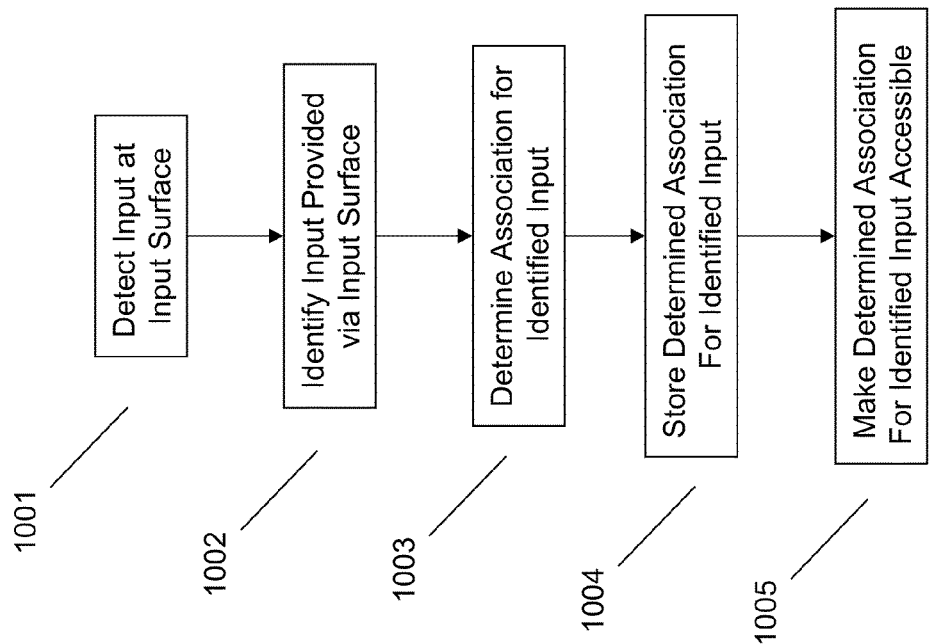
FIG. 10 illustrates an example method of storing and making accessible stylus inputs.

A user may create a lexicon of symbols. As illustrated in FIG. 10, a user's input may be detected at the input surface at 1001 and thereafter an input is identified 1002. The identification may be dependent an a training or learning process, e.g., in a case where a user's writing is unusual or non-standard or in a case where the user is providing custom symbols not yet logged into a lexicon available to the device.

For example, a user may provide input into a symbol training interface to assist the system in learning a user's inputs (e.g., based on the user's handwriting characteristics). This equates roughly to providing repeated inputs to allow an embodiment to learn a proper OCR identification for particular symbols. Likewise, in addition to default symbols (e.g., provided by default as part of the system), a user may input custom symbols. This allows for proper identification of inputs at 1002.

Moreover, a user, having certain symbols available in the system (e.g., custom and/or default symbols) may modify the actions associated with the symbols, therefore influencing the association determined for inputs at 1003. For example, a user may modify an action associated with a symbol (e.g., executed by an embodiment when recognized) to another action. A user may modify the action associated with a symbol (or group or pattern of symbols), e.g., by inputting the symbols and then selecting the action to be associated therewith or by modifying a default action assigned to a default symbol or group of symbols.

Once the user has provided a symbol in a reproducible and recognizable way and chosen or confirmed an association for the symbol, it may be stored, e.g., in a lexicon, at 1004. The lexicon may be stored on a user's local device, on a remote device (e.g., in cloud storage) or a combination of locations. In a case where the user's lexicon of symbols and associations is stored in a network or cloud device, the user's lexicon may be made accessible at 1005, e.g., to the user alone (e.g., across the particular user's devices) or across a community of devices (e.g., cloud community). Moreover, updates to the lexicon may be consistently maintained across devices.

Moreover, to build better lexicons and language usages, users can opt into sharing their lexicons (e.g., anonymously) such that lexicons that are made accessible at 1005 may be accessible by other community users. This provides a community of users which are amendable to sharing information regarding lexicons. Such community information may be accessed by an embodiment. For example, this allows a comparison between symbols users are using to produce various commands. Users can see what others are doing for new commands and the like, and decide if they want to adopt a symbol and/or command as well. Also, users may replace one of their own symbols for a command with one from the community that they prefer.

Figure 11:
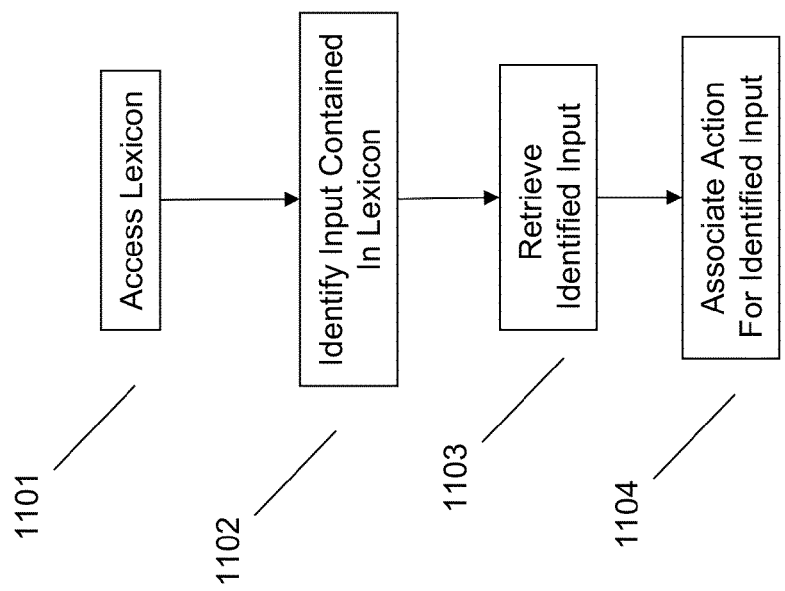
FIG. 11 illustrates an example of lexicon accessing and symbol/association inclusion.

For example, as illustrated in FIG. 11, a user may access a lexicon at 1101, e.g., a community lexicon available in a cloud service. The user may then identify an input, e.g., a particular symbol, at 1102 that is contained in the lexicon. The user can retrieve the input at 1103, e.g., download it to his or her lexicon stored in his or her cloud account, on his or her device, etc. Thereafter, the user may associate an action with the newly retrieved input at 1104, e.g., associate an application action with a newly retrieved symbol. The newly retrieved symbol may have an action already associated with it, which the user may modify or change, or the symbol may need an action chosen for it by the user.

For example, if a user has been writing "Message Joe" to send a message to a contact "Joe", but is able to access information about the community of users (e.g., via a cloud account or service), that other users are using "~" to replace the "message" portion of the command of sending a message, the user may add that symbol for the message action to his or her lexicon. Thus, the user could then optionally write "~" or "Message" to trigger the message action or command. Alternatively, the user may replace the "Message" symbol with the symbol "~".

As another example, the symbol "|* *|" may be used in the community for the word "cassette tape", but a particular user does not have that symbol in his or her lexicon. A user may utilize an embodiment to add such a new symbol (e.g., download it from a community lexicon) to start using it, e.g., assign it a command such as open music player, insert phrase "cassette tape" in place of that symbol, etc.

A user's lexicon can carry over from device to device and lexicons can be shared between users. The symbols are relevant to the user's perspective, not necessarily to the system. For example, the system can recognize many different symbols for the same command, similar to the example outlined in connection with FIG. 6 regarding treating various user inputs as triggering the same command. A default limited set can be provided by the system and allow users to add/remove/edit symbols. By doing this, a symbol, e.g., for a clock, does not have to be the same as another user's symbol for a clock, but the two user's systems recognize both of the symbols as indicating "clock". Thus, if a symbol is transferred between users, e.g., in a message transferred from a first user to a second user, the user systems need not know the symbol prior to the message transfer to properly interpret the symbol.

For example, a first user and a second user may each have a tablet device of their own. If the first user inputs (e.g., draws with a stylus) a symbol and sends it to the second user, the second user can add that symbol to his or her lexicon. Thus, the second user may adopt the first user's symbol. In the alternative, the second user's system may translate the symbol (e.g., using a community lexicon accessible via a cloud service and/or the second user's lexicon) for the second user into an equivalent symbol, e.g., one used by or recognizable to the second user. In such a way, it does not matter to the system because the system reads both versions of the symbol with the same meaning and therefore allows a transparency or translation function to be achieved for the users to communicate.

Moreover, using a shared lexicon (e.g., a community lexicon available for example via a cloud service) a user need not train or teach their local system to use symbols that have already been defined by another user or the community. For example, for a particular user and system, a new symbol would not have to be trained into the user's system if it is available via a shared lexicon. Thus, a user does not have to teach each new symbol (or combination of symbols) or each new device to use a symbol, the appropriate lexicon may simply be downloaded or otherwise accessed by the new device and new symbols may be transferred or otherwise accessed from shared lexicons. Thus, utilizing a linking technology (e.g., a cloud service), a user's personal lexicon can be supplemented by additional entries from another lexicon (e.g., a community lexicon), including use of a translation function (e.g., symbols may be translated between users and/or devices rather than added to each others lexicons).

In brief recapitulation, an embodiment provides a variety of ways in which additional meanings may be imparted when using writing, including symbol(s), as input to a device. Thus, embodiments greatly enhance the use of writing implements such as a stylus and allow an increased sense that the device intelligently understands or infers meaning similar to how human users interpret writing and organized symbols.

It will be readily understood by those having ordinary skill in the art that the various embodiments or certain features of the various embodiments may be implemented as computer program products in which instructions that are executable by a processor are stored on a computer readable or device medium. Any combination of one or more non-signal device readable medium(s) may be utilized. The non-signal medium may be a storage medium. A storage medium may be any non-signal medium, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), a personal area network (PAN), or the connection may be made through other devices (for example, through the Internet using an Internet Service Provider) or through a hard wire connection, such as over a USB connection.

Aspects are described herein with reference to the figures, which illustrate examples of inputs, methods, devices and program products according to various example embodiments. It will be understood that the actions and functionality illustrated may be implemented at least in part by program instructions. These program instructions may be provided to a processor of a general purpose information handling device, a special purpose information handling device, or other programmable data processing device or information handling device to produce a machine, such that the instructions, which execute via a processor of the device implement the functions/acts specified.

The program instructions may also be stored in a device readable medium that can direct a device to function in a particular manner, such that the instructions stored in the device readable medium produce an article of manufacture including instructions which implement the function/act specified.

The program instructions may also be loaded onto a device to cause a series of operational steps to be performed on the device to produce a device implemented process such that the instructions which execute on the device provide processes for implementing the functions/acts specified.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method comprising:
   detecting handwriting input of one or more symbols to a surface of a first device;
   identifying, using at least one processor, one or more input parameters during input of the one or more symbols;
   determining, using at least one processor, one or more of the input parameters differs from a predetermined input parameter;
   identifying a modification to a characteristic associated with the one or more symbols based on the one or more input parameters differing from the predetermined input parameter; and
   executing an action corresponding to the modification identified.

2. The method of claim 1, wherein the one or more input parameters identified comprise one or more of a speed of symbol input, a pressure of symbol input, and a tilt of symbol input.

3. The method of claim 1, wherein the predetermined input parameter comprises a history of stored user input parameters and wherein determining one or more of the input parameters differ from a predetermined input parameter comprises comparing the one or more input parameters to the predetermined input parameter.

4. The method of claim 3, wherein the history of stored user input parameters correspond to a history of inputs to the first device.

5. The method of claim 1, wherein executing an action corresponding to the modification identified comprises executing an additional action in combination with execution of a default action for the one or more symbols.

6. The method of claim 5, wherein the additional action comprises an intermediate action that delays the default action.

7. The method of claim 5, wherein the additional action comprises a filtering action.

8. The method of claim 5, wherein the additional action comprises displaying an option to confirm the default action prior to its execution.

9. The method of claim 5, wherein the additional action comprises modifying one or more independent actions of one or more applications of the first device.

10. The method of claim 9, wherein the one or more independent actions of one or more applications of the first device comprise notification actions, and further wherein the additional action comprises muting a notification of an incoming communication to the first device received by the one or more applications of the first device.

11. An information handling device, comprising:
    a device surface configured to receive user input;
    one or more processors; and
    a memory accessible to the one or more processors storing instructions executable by the one or more processors to:
    detect handwriting input of one or more symbols to the device surface;
    identify one or more input parameters during input of the one or more symbols;
    determine one or more of the input parameters differs from a predetermined input parameter;
    identify a modification to a characteristic associated with the one or more symbols based on the one or more input parameters differing from the predetermined input parameter; and
    execute an action corresponding to the modification identified.

12. The information handling device of claim 11, wherein the one or more input parameters comprise one or more of a speed of symbol input, a pressure of symbol input, and a tilt of symbol input.

13. The information handling device of claim 11, wherein the predetermined input parameter comprises a history of stored user input parameters and wherein to determine one or more of the input parameters differ from a predetermined input parameter comprises comparing the one or more input parameters to the predetermined input parameter.

14. The information handling device of claim 13, wherein the history of stored user input parameters correspond to a history of inputs to the information handling device.

15. The information handling device of claim 11, wherein to execute an action corresponding to the modification identified comprises executing an additional action in combination with execution of a default action for the one or more symbols.

16. The information handling device of claim 15, wherein the additional action comprises an intermediate action that delays the default action.

17. The information handling device of claim 15, wherein the additional action comprises a filtering action.

18. The information handling device of claim 15, wherein the additional action comprises displaying an option to confirm the default action prior to its execution.

19. The information handling device of claim 15, wherein the additional action comprises modifying one or more independent actions of one or more applications of the information handling device.

20. A product, comprising:
    a computer readable storage medium storing instructions executable by one or more processors, the instructions comprising:
    computer readable program code that detects handwriting input of one or more symbols to a surface of a first device;
    computer readable program code that identifies one or more input parameters during input of the one or more symbols;
    computer readable program code that determines one or more of the input parameters differs from a predetermined input parameter;

computer readable program code that identifies a modification to a characteristic associated with the one or more symbols based on the one or more input parameters differing from the predetermined input parameter; and computer readable program code that executes an action corresponding to the modification identified.

\* \* \* \* \*